United States Patent
Kuo et al.

(10) Patent No.: US 11,860,331 B2
(45) Date of Patent: Jan. 2, 2024

(54) DETECTION SYSTEM AND DETECTION METHOD

(71) Applicant: ASUSTeK COMPUTER INC., Taipei (TW)

(72) Inventors: Chun-Liang Kuo, Taipei (TW); Chang-Yi Shen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 881 days.

(21) Appl. No.: 16/893,648

(22) Filed: Jun. 5, 2020

(65) Prior Publication Data
US 2020/0400855 A1    Dec. 24, 2020

(30) Foreign Application Priority Data
Jun. 20, 2019   (TW) .................................. 108121563

(51) Int. Cl.
| | |
|---|---|
| *H04W 64/00* | (2009.01) |
| *H04W 4/02* | (2018.01) |
| *G01V 3/12* | (2006.01) |
| *H04N 7/18* | (2006.01) |
| *G01S 5/02* | (2010.01) |

(52) U.S. Cl.
CPC .............. *G01V 3/12* (2013.01); *G01S 5/0294* (2013.01); *H04N 7/188* (2013.01); *G01S 2205/09* (2020.05)

(58) Field of Classification Search
CPC ..... G01V 3/12; G01S 5/0294; G01S 2205/09; H04N 7/188
See application file for complete search history.

(56) References Cited

U.S. PATENT DOCUMENTS

| | | | |
|---|---|---|---|
| 8,179,441 B2 | 5/2012 | Yen et al. | |
| 8,218,011 B2 | 7/2012 | Cheng et al. | |
| 8,786,198 B2 | 7/2014 | De Groot | |
| 2011/0130881 A1* | 6/2011 | Nanami | G05B 15/02 700/277 |

(Continued)

FOREIGN PATENT DOCUMENTS

| | | |
|---|---|---|
| CN | 109818839 A | 5/2019 |
| TW | 201026025 A | 7/2010 |

(Continued)

*Primary Examiner* — Moustapha Diaby
(74) *Attorney, Agent, or Firm* — McClure, Qualey & Rodack, LLP

(57) ABSTRACT

A detection system and detection method are disclosed herein, the detection system includes a first detector, a second detector, an actuator and a processing device. The first detector and the second detector detect a target in a first detection range and a second detection range respectively, to generate a first detection signal and a second detection signal. The processing device establishes a detection movement path according to the first detection signal and the second detection signal, compares the detection movement path with a plurality of historical movement paths to select the historical movement path that best matches the detection movement path from the historical movement paths, and transmits a driving signal to the actuator in a third detection range when the processing device predicts that the target moves to the third detection range according to the best matching historical movement path.

13 Claims, 6 Drawing Sheets

(56) References Cited

U.S. PATENT DOCUMENTS

| | | | | |
|---|---|---|---|---|
| 2013/0320864 A1* | 12/2013 | Yoo | ............... | H05B 47/115 |
| | | | | 315/154 |
| 2015/0227118 A1* | 8/2015 | Wong | ............ | H04L 12/2827 |
| | | | | 700/44 |
| 2018/0329617 A1* | 11/2018 | Jones | ............... | G05B 15/02 |
| 2020/0082551 A1* | 3/2020 | Steiner | ............ | G01S 13/867 |

FOREIGN PATENT DOCUMENTS

| | | |
|---|---|---|
| TW | 201100707 A | 1/2011 |
| TW | I391801 B | 4/2013 |

\* cited by examiner

DETECTION SYSTEM AND DETECTION METHOD

CROSS-REFERENCE TO RELATED APPLICATION

This application claims the priority benefit of Taiwan applications serial No. 108121563, filed on Jun. 20, 2019. The entirety of the above-mentioned patent application is hereby incorporated by reference herein and made a part of specification.

BACKGROUND OF THE INVENTION

Field of the Invention

This disclosure generally relates to a detection system and a detection method.

Description of the Related Art

With the rapid development of technology, various electronic devices with different functions, such as electric lights, air conditioners, cameras, routers, etc., become an indispensable part of people's daily life. In order to use these electronic devices more efficiently and conveniently, a management system for monitoring or managing multiple electronic devices came into being.

However, in order to prevent high energy consumption due to the electronic device running for a long time, the management system needs to effectively control the power consumption of the electronic device.

BRIEF SUMMARY OF THE INVENTION

According to the first aspect, a detection system is provided herein. The detection system includes: a first detector, configured to generate a first detection signal when a target is detected in a first detection range; a second detector, configured to generate a second detection signal when the target is detected in a second detection range; at least one actuator; a storage unit, for storing a program instruction and a plurality of historical movement paths; and a processing device, connected to the first detector, the second detector, the storage unit and the actuator, the processing device is configured to access the program instruction from the storage unit, to execute the following steps: establishing a detection movement path according to the first detection signal and the second detection signal; comparing the detection movement path with the historical movement paths, to select a best matching historical movement path that best matches the detection movement path from the historical movement paths; and transmitting a driving signal to the actuator located in the third detection range to drive the actuator when the target is predicted to move to a third detection range according to the best matching historical movement path.

According to the second aspect, a detection method is provided herein. The detection method includes the following steps: receiving a first detection signal generated when a target is detected in a first detection range; receiving a second detection signal generated when the target is detected in a second detection range; establishing a detection movement path according to the first detection signal and the second detection signal; comparing the detection movement path with a plurality of historical movement paths, to select a best matching historical movement path from the historical movement paths that matches the detection movement path the best; transmitting a driving signal to the actuator in a third detection to drive the actuator when the target is predicted to move to a third detection range according to the best matching historical movement path.

Based on the above, because the processing device determines the position of the actuator by detecting the movement path, before the users does not entered the specific detection range, the actuator in the specific detection range keeps in a less power consumption state, avoiding consuming power due to the actuator is activated for a long time.

DETAILED DESCRIPTION OF THE EMBODIMENTS

A plurality of embodiments of this disclosure is disclosed below by using figures. For clear description, many practical details are described together in the following statement. However, it should be learnt that these practical details should not be intended to limit this disclosure. That is, in some embodiments of this disclosure, these practical details are unnecessary. In addition, to simplify the figures, some conventional common structures and elements are illustrated in a simple schematic manner in the figures.

In the disclosure, the term "connect" or "couple" means "electrically connect" or "electrically couple". The term "connect" or "couple" also means the interaction or cooperation between/among two or more components. In addition, the words "first", "second" and the like are configured to distinguish individual elements/operations that have the same technical terms, but not refer to any special item or imply any sequence unless expressly stated.

Figure 1:
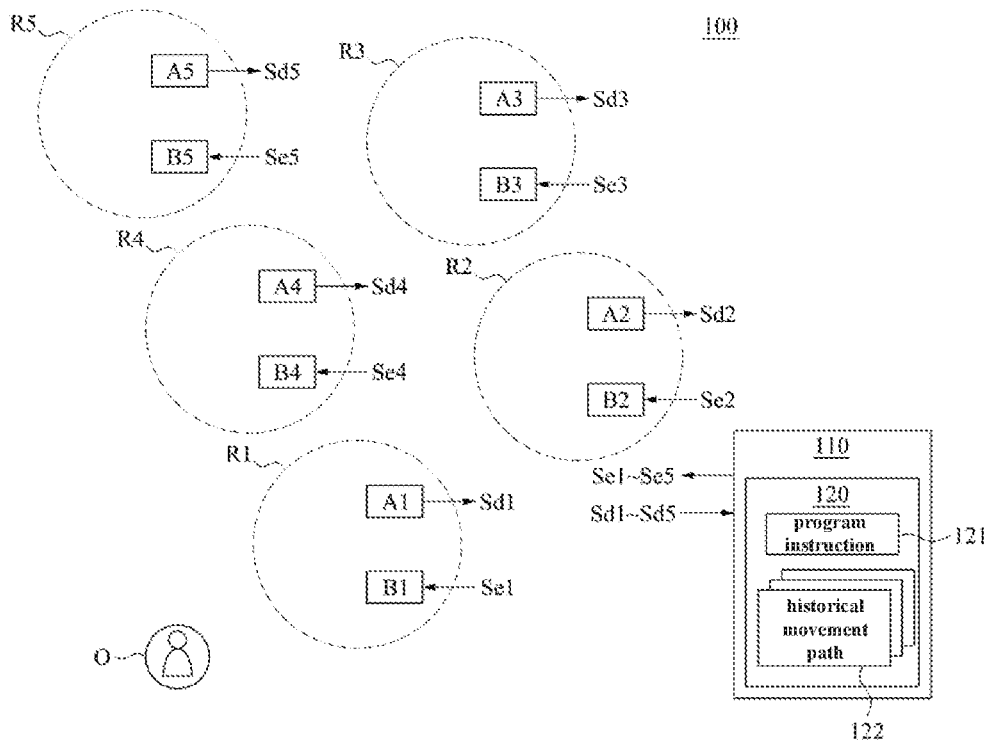
FIG. 1 is a schematic diagram of a detection system according to some embodiments of the disclosure.

Please refer to FIG. 1, which is a schematic diagram of a detection system 100 according to some embodiments of the present disclosure. In an embodiment, the detection system 100 includes a plurality of detectors A1 to A5, a plurality of actuators B1 to B5, a processing device 110, and a storage unit 120. In an embodiment, the detector and the actuator are set in the same electronic device.

The detectors A1 to A5 are disposed in detection ranges R1 to R5 respectively. In an embodiment, the detectors A1 to A5 respectively generate the detection signals Sd1 to Sd5 when the target is in detection ranges R1 to R5. The detectors A1 to A5 are light detectors, infrared detectors, sound detectors, image detectors, temperature detectors, odor detectors, or so on, which are configured to detect the sound, image, temperature, or odor of the target, which is not limited herein. The detection ranges R1 to R5 are different according to the detection principle of the detectors A1 to A5. For example, the detection range of the image detector has directionality, but the detection range of the temperature detector has no directionality.

The actuators B1 to B5 are driven according to a driving signals Se1 to Se5. The actuators B1 to B5 include cameras, radios, lighting devices, or air conditioners. In addition, the actuators B1 to B5 also include network devices (such as routers or sharing devices). When the actuators B1 to B5 include a monitoring device, it is configured to capture video data or audio data. When the actuators B1 to B5 include a network device, it is configured to transmit and receive wireless signals. In addition, when receiving the driving signals, the actuators B1 to B5 switch from a first state with less power consumption (such as at a shutdown state or a sleep state) to the second state with higher power consumption (such as: sending signals or capturing signals).

In an embodiment, the actuators B1 to B5 correspond to the detectors A1 to A5 respectively. In other words, the detection range R1 has the detector A1 and the actuators B1, the detection range R2 has the detector A2 and the actuators B2, the detection range R3 has the detector A3 and the actuators B3, the detection range R4 has the detector A4 and the actuators B4, and the detection range R5 has the detector A5 and the actuators B5. In an embodiment, the detector A1 and the actuator B1 are included in a same electronic device, the detector A2 and the actuator B2 are included in a same electronic device, the detector A3 and the actuator B3 are included in a same electronic device, the detector A4 and the actuator B4 are included in a same electronic device, and the detector A5 and the actuator B5 are included in a same electronic device. In an embodiment, at least one of the detection ranges R1 to R5 only includes the corresponding detectors A1 to A5. In an embodiment, at least one of the detection ranges R1 to R5 only includes the actuators B1 to B5. The details are described later.

The processing device 110 is connected to the detectors A1 to A5 and the actuators B1 to B5, to receive the detection signals Sd1 to Sd5 or transmit the driving signals Se1 to Se5 respectively. In some embodiments, the processing device 110 is connected to the detectors A1 to A5 and the actuators B1 to B5 via wired or wirelessly. In some other embodiments, the processing device 110 is a cloud server which is connected to the detectors A1 to A5 and the actuators B1 to B5 through the Internet.

The storage unit 120 stores a program instruction 121 and a plurality of historical movement paths 122. The program instruction is a determining program of the detection system 100. In an embodiment, the storage unit 120 is disposed in the processing device 110.

In an embodiment, the detection system 100 detects the position of the target O. The processing device 110 accesses the program instruction 121 from the storage unit 120 to perform a detection method. When executing the program instruction 121, the processing device 110 establishes a detection movement path according to the received detection signals Sd1 to Sd5 and predicts (such as calculates) the actuator that should be driven based on the detection movement path, and transmits a drive signal to drive the predicted actuator. In other words, the processing device 110 predicts the movement direction of the target object based on the detection movement path, to drive the corresponding actuator in advance.

Figure 2A:
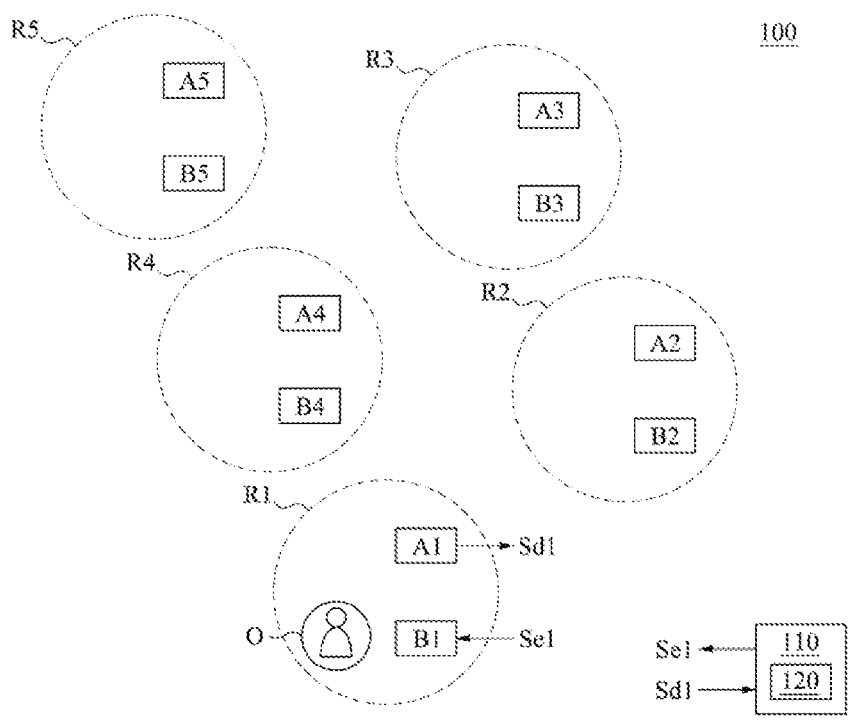
FIG. 2A is a schematic diagram of an operating ways of the detection system according to some embodiments of the disclosure.

Please refer to FIG. 2A to FIG. 2E, which are schematic diagrams of the operation of the detection system 100 according to some embodiments of the disclosure. As shown in FIG. 2A, when the target O is in the first detection range R1, the first detector A1 generates the first detection signal Sd1 according to the environmental changes (such as light and shadow changes, sound changes, temperature changes, and so on) in the first detection range R1. When receiving the first detection signal Sd1, the processing device 110 transmits the first driving signal Se1 to drive the actuator B1 corresponding to the first detection range R1. At the same time, the processing device 110 obtains the current position of the target O according to the first detection signal Sd1 and records the current position of the target O1 through the storage unit 120.

Figure 2B:
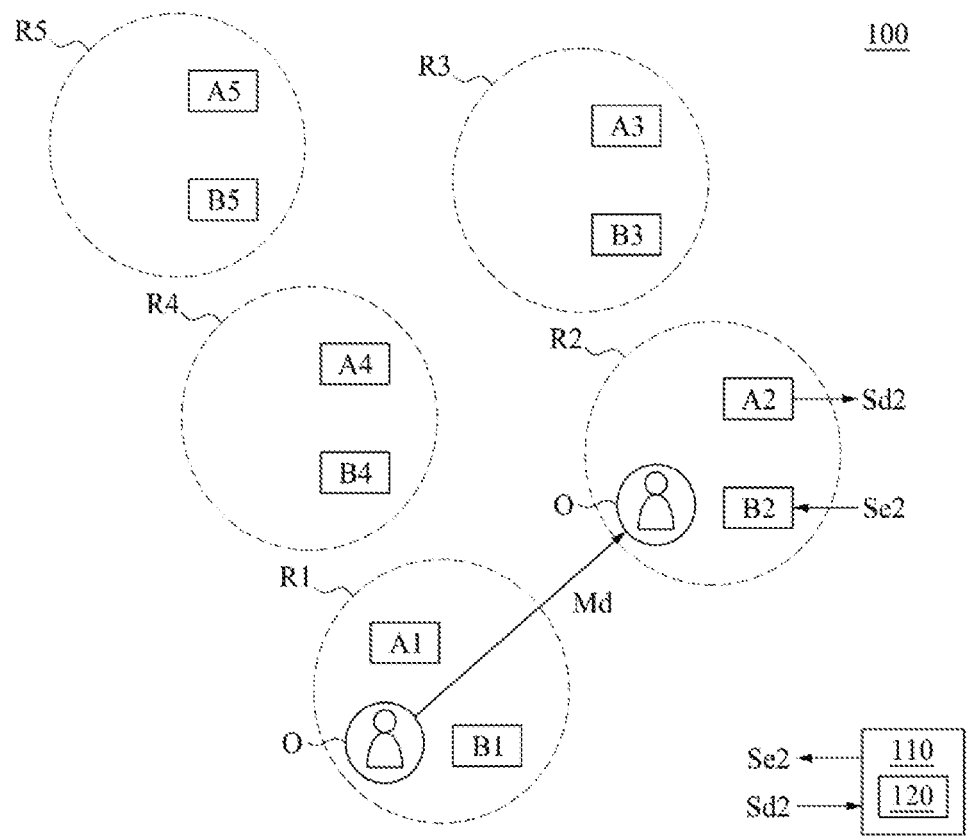
FIG. 2B is a schematic diagram of the operating ways of the detection system according to some embodiments of the disclosure.

Please refer to FIG. 2B. When the target O moves from the first detection range R1 to the second detection range R2, the second detector A2 generates the second detection signal Sd2 according to the environmental changes in the second detection range R2. The processing device transmits the second driving signal Se2 to drive the actuator B2 corresponding to the second detection range R2 when receiving the second detection signal Sd2. At the same time, the processing device 110 also establishes a detection movement path Md according to the first detection signal Sd1 and the second detection signal Sd2. In addition, when the first detection signal Sd1 is no longer received, the processing device 110 determines that the target O has left the first detection range R1, so that the processing device 110 transmits a disable signal to the actuator B1 to turn off the actuator B1 or limit its function.

In an embodiment, the detection movement path Md includes the first detection range R1 and the second detection range R2 (hereinafter referred to as "R1, R2", particularly, the detection movement path Md has a sequence relationship), the processing device 110 predicts a next detection area that the target O might go according to the detection movement path Md. In an embodiment, the processing device 110 compares the detection movement path with a plurality of historical movement paths and selects the best matching historical movement path that best matches the detection movement path from the historical movement paths, and then predicts the actuator that should be driven and the corresponding detection range based on the best matching historical movement path. The historical movement path is a past behavior record of the target O. Take two different historical movement paths "R1, R4, R2" and "R1, R2, R3" as an example. The historical movement path "R1, R2, R3" is more similar to the detection movement path "R1, R2" than the historical movement paths "R1, R4, R2". Therefore, the processing device 110 predicts that the target O moves to a third detection range R3 according to the best matching historical movement path "R1, R2, R3". Then, the processing device 110 transmits the driving signal to the actuator B3 located in the third detection range R3, to drive the actuator B3 to switch from the first state with less power consumption to the second state with higher power consumption.

The detection method of disclosure improves the power consumption of the detection system 100. In an embodiment, the detection ranges R1 to R5 are respectively located in different rooms or corridors. When the target O (such as a household, a user, a person in need of care) enters the detection range R1 and the corresponding detector A1 detects the target O, the actuator B1 is driven to operate, and the remaining actuators B2 to B5 are asleep. When the target O leaves the detection range R1 and moves into the detection range R2, the processing device 110 starts recording the detection movement path. The processing device 110 predicts the movement direction of the target O and drives the corresponding actuator in advance according to the detection movement path. Therefore, since not all the detectors A1 to A5 and the actuators B1 to B5 need to be kept in operation, the power consumption of the detection system 100 is improved and thus saves the energy.

In some embodiments, the storage unit 120 further stores the data of the detectors A1 to A5 and the actuators B1 to B5, such as the detection ranges R1 to R5 of the detectors A1 to A5, and the corresponding relationship between the detectors A1 to A5 and the actuators B1 to B5. The storage unit 120 is set in the processing device 110 or set in an independent separate server.

Figure 2C:
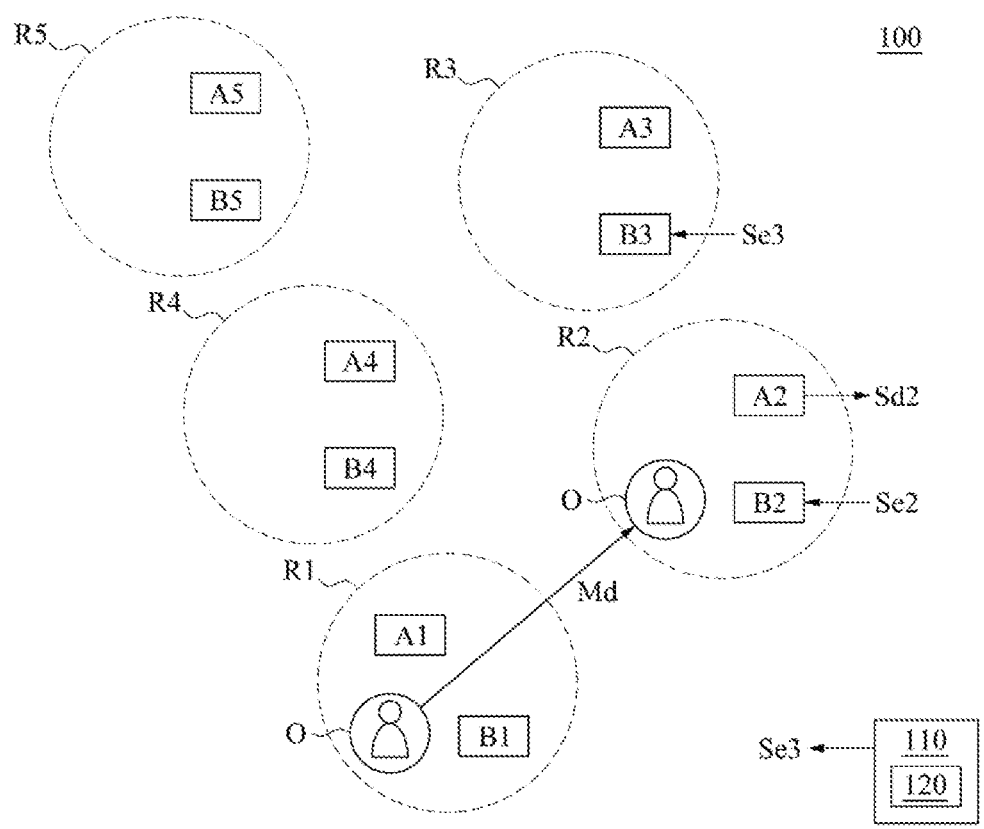
FIG. 2C is a schematic diagram of the operating ways of the detection system according to some embodiments of the disclosure.

Please refer to FIG. 2C. When the target object O is still in the second detection range R2, the processing device 110 predicts that the third detection range R3 is the next possible movement of the target object O according to the historical movement path "R1, R2, R3" and transmits the third driving signal Se3 to the third actuator B3, to drive the third actuator B3 to perform the corresponding action, such as starting up, waking up, enabling monitoring function or enabling signal transmission function, or so on.

Figure 2D:
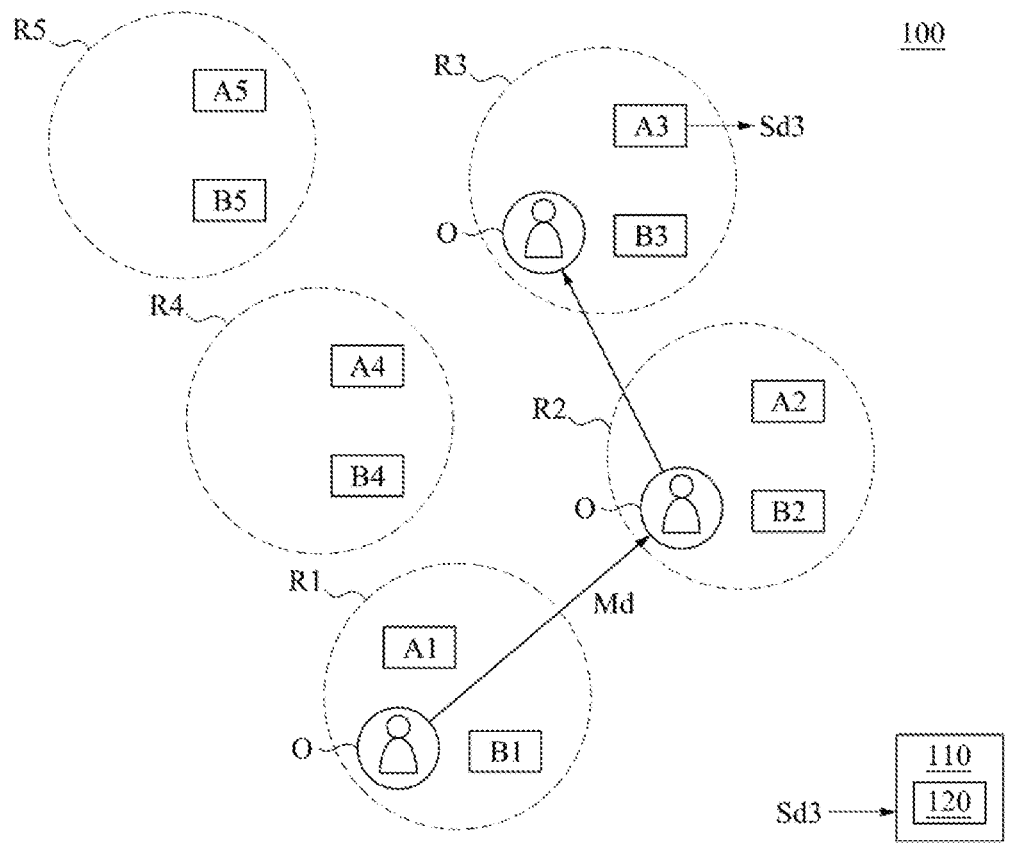
FIG. 2D is a schematic diagram of the operating ways of the detection system according to some embodiments of the disclosure.
Figure 2E:
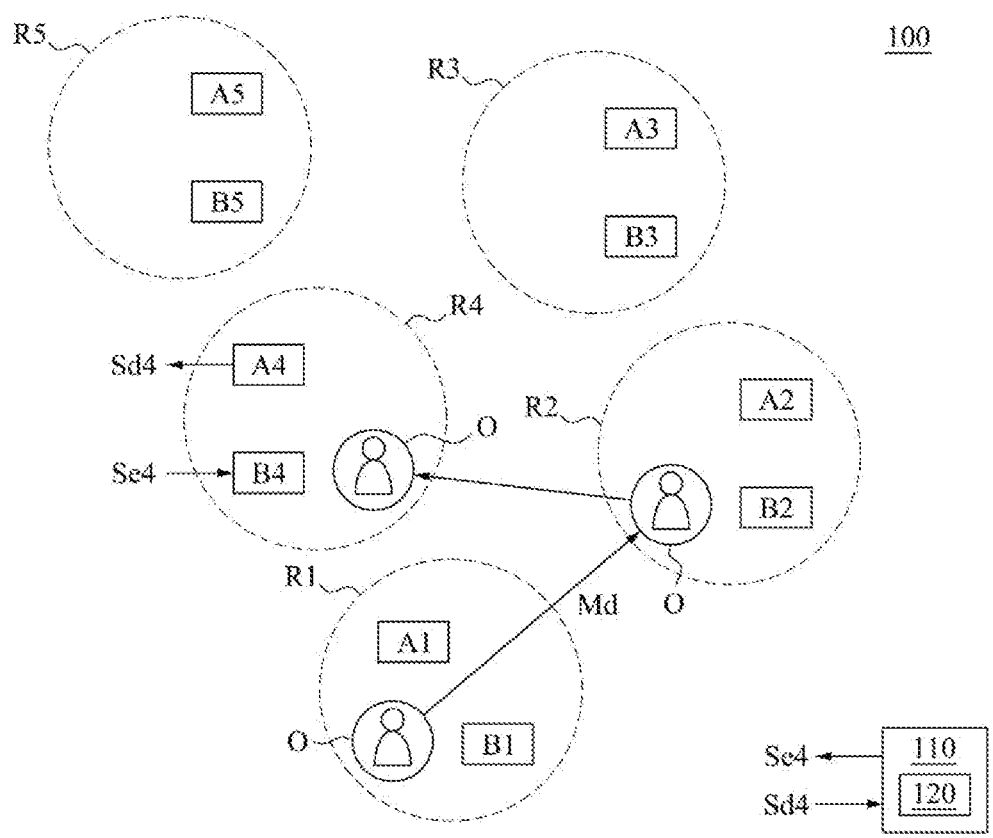
FIG. 2E is a schematic diagram of the operating ways of the detection system according to some embodiments of the disclosure.

Please refer to FIG. 2D. When the target O moves to the third detection range R3 as predicted by the processing device 110, the third detector A3 generates the third detection signal Sd3 according to the environmental changes in the third detection range R3. When receiving the third detection signal Sd3, the processing device 110 confirms that the prediction result is correct, and updates the detection movement path Md to "R1, R2, R3". In some embodiments, the processing device 110 further records the prediction result as correct. The more correct times, the higher the reliability of the historical movement path "R1, R2, R3". Next time when the processor 110 predicts the target movement path, even if the historical movement paths include "R1, R2, R3" and "R1, R2, R4", the processing device 110 still recognizes that "R1, R2, R3" is the best matching historical movement path with the detection movement path "R1, R2". Then, the processing device 110 continues to determine the next possible movement position of the target O based on the same principle. Since the data in the detection movement path Md increases as the user moving forward, the accuracy of the determination also increases.

In the embodiment shown in FIG. 2D, after the processing device 110 receives the third detection signal Sd3, the prediction result is confirmed to be correct, and the processing device also adds the updated detection movement path Md as a historical movement path.

When the actuator predicted by the processing device 110 (such as the third actuator B3) does not match the direction in which the target actually moves (for example, the target O moves toward the fourth detection range R4, instead of the predicted third detection range R3), the processing device 110 executes the corresponding calibration program. Please refer to FIG. 2E. In an embodiment, when the target O leaves the second detection range R2, and moves to the fourth detection range R4, instead of going to the third detection range R3 predicted by the processing device 110, the fourth detector A4 detects the target O and generates the fourth detection signal Sd4 when the environmental of the fourth detection range R4 changes. When receiving the fourth detection signal Sd4, the processing device 110 determines that the previous prediction of the processing device 110 is wrong. At this time, the processing device 110 updates the detection movement path Md to "R1, R2, R4", and adds the updated detection movement path Md "R1, R2, R4" as a historical movement path. The processing device 110 further transmits a disable signal to the third actuator B3 to turn off the third actuator B3.

Please refer to FIG. 1 and FIG. 2A. In some embodiments, when the detection movement path Md is "R1, R2", the processing device 110 also determines which one of the detection ranges is close to the current position of the target O to improve the accuracy of the prediction. In an embodiment, the first detection range R1, the third detection range R3, and the fourth detection range R4 are all adjacent to the second detection range R2 (the current position of the target O), and the target O passed the first detection range R1 first and then enters the second detection range R2. Therefore, the processing device 110 performs prediction based on the historical movement path and the relative positional relationship between multiple detection ranges. In an embodiment, because the target O already passed the first detection range R1, the processing device 110 excludes the first detection range R1 as the predicted result, and selects the third detection range R3 with the highest probability as the predicted result according to the direction of the detection movement path Md and the historical movement path.

In an embodiment, the detectors A1 to A5 include a network device for transmitting wireless signals with a mobile device (such as a smart phone) carried by the use (that is, the target O). The detectors A1 to A5 respectively determine whether the target O is located in the detection ranges R1 to R5 or not according to the strength of the wireless signals received from the mobile device, to generate the corresponding detection signals. In an embodiment, when the strength of the wireless signal received by the detector A1, A2, A3, A4 or A5 is higher than a threshold value, the detector A1, A2, A3, A4 or A5 determines that the target O is located within the corresponding detection range R1, R2, R3, R4 or R5, and generates corresponding detection signals Sd1, Sd2, Sd3, Sd4 or Sd5.

In this disclosure, the detection system 100 determines the path of the target O to accurately drive the corresponding actuator. In addition, when the target O does not enter the detection range, the actuator in the detection range is in a state of less power consumption, avoiding long-term operation and wasting power consumption.

Figure 3:
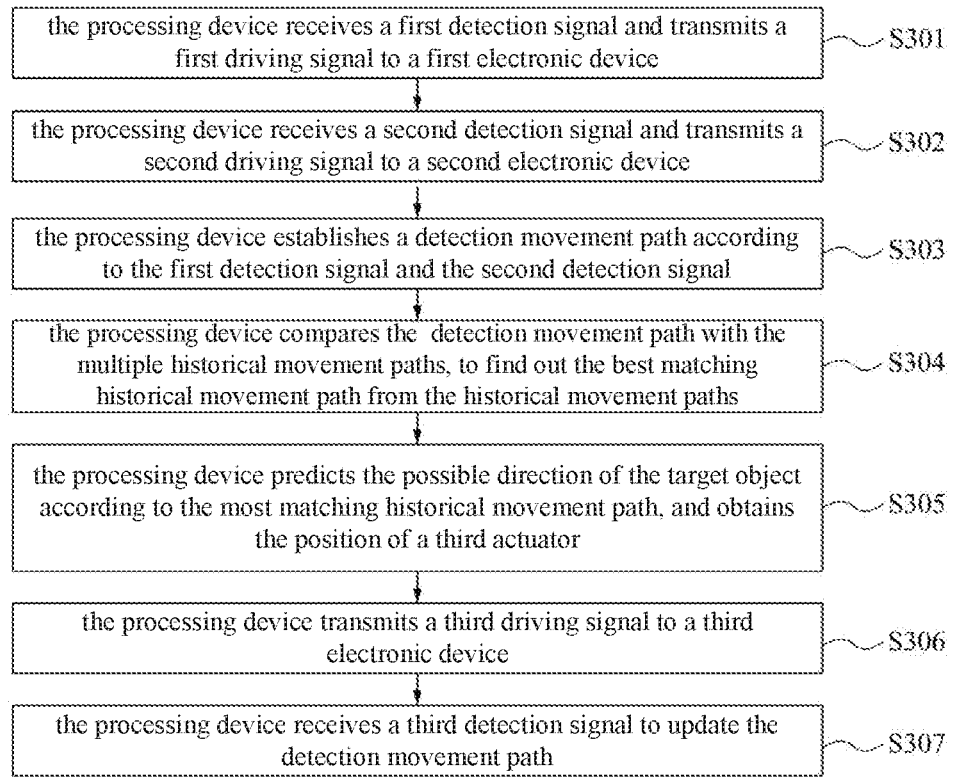
FIG. 3 is a schematic diagram of a detection method according to some embodiments of the disclosure.

Please refer to FIG. 3, which is schematic diagram of a detection method with steps S301 to S307 according to some embodiments of the present disclosure. In the step S301, the processing device 110 receives the first detection signal Sd1 from the first detection device A1 and transmits the driving signal Se1 to the actuator B1 to drive the actuator B1. In the step S302, the processing device 110 receives the second detection signal Sd2 from the second detection device A2, and transmits a driving signal Se2 to the actuator B2 to drive the actuator B2.

In the step S303, the processing device 110 establishes a detection movement path Md according to the first detection signal Sd1 and the second detection signal Sd2. In the step S304, the processing device 110 compares the detection movement path Md with the multiple historical movement paths, to find out the best matching historical movement path from the historical movement paths. In the step S305, the processing device 110 predicts that the target O move to the third detection range R3 and obtains the position of the actuator B3 according to the most matching historical movement path. In an embodiment, the processing device 110 is connected to the storage unit 120 to obtain the data of the detectors A1 to A5 and the data of the actuators B1 to B5. When the processing device 110 predicts that the target O moves to the third detection range R3, the processing device 110 further confirms the actuator B3 corresponding to the third detection range R3, and obtains the identification code of the actuator B3 (equivalent to the step of "confirm position").

In the step S306, the processing device 110 transmits the driving signal Se3 to the actuator B3 to drive the actuator B3. In the step S307, the processing device 110 updates the detection movement path Md according to the third detection signal. In addition, when the processing device 110 does not receive the third detection signal Sd3, but receives the fourth detection signal Sd4 (that is, although the processing device 110 predicts that the target O moves to the third detection range R3, the target O is not located in the third detection range R3 but is located in the fourth detection range R4.), it means that the prediction of the processing device 110 is incorrect. At this time, the detection method of the present disclosure updates the detection movement path Md based on the fourth detection signal Sd4. In an embodiment, the processing device 110 simultaneously stores the updated detection movement path Md to the storage unit 120 as a new historical movement path. Since the method of updating the detection movement path has been described in detail in the embodiment shown in FIG. 2A to FIG. 2E, it is not repeated herein.

Figure 4:
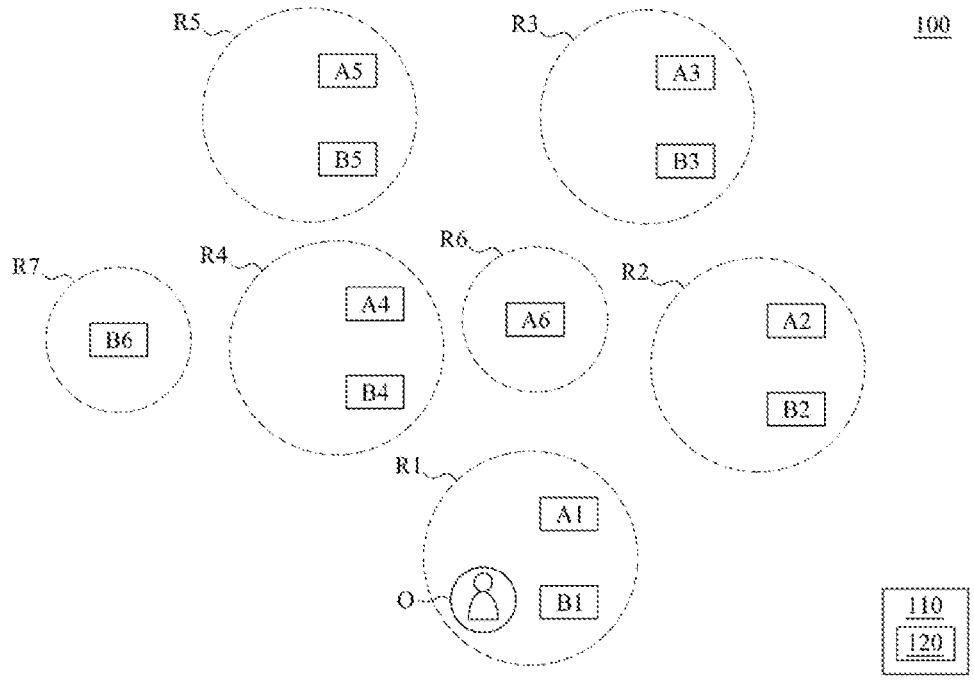
FIG. 4 is a schematic diagram of the detection system according to some embodiments of the disclosure.

In the foregoing embodiments, the detection range R1 has the detector A1 and the actuators B1, the detection range R2 has the detector A2 and the actuators B2, the detection range R3 has the detector A3 and the actuators B3, the detection range R4 has the detector A4 and the actuators B4, and the detection range R5 has the detector A5 and the actuators B5. However, in other embodiments, in order to save the installation cost of the detection system 100, the detection range includes only the detector, or only the actuator. Please refer to FIG. 4, which is a schematic diagram of a detection system according to some embodiments of the present disclosure. In this embodiment, the detection system 100 further includes a detection range R6 and a driving range R7. The detection range R6 only includes the detector A6, and the driver range R7 only includes the actuator B7. The detection range R6 is set in a narrow range or where the target O does not stay for a long time, so the position of the target O is confirmed through the detector A6 without setting an actuator. In an embodiment, the driving range R7 is an end point of a path (such as a corner of a wall). Therefore, the driving range R7 monitors or provides wireless signals through the actuator B7 without tracking the position herein.

The elements, method steps, or technical features in the foregoing embodiments can be combined with each other, without being limited to the order of text description or the presentation of the drawings in the disclosure.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A detection system, comprising:
a first detector, configured to generate a first detection signal when a target is detected in a first detection range;
a second detector, configured to generate a second detection signal when the target is detected in a second detection range;
at least one actuator;
a storage unit, for storing a program instruction and a plurality of historical movement paths; and
a processing device, connected to the first detector, the second detector, the storage unit and the actuator, the processing device is configured to access the program instruction from the storage unit, to execute the following steps:
establishing a detection movement path according to the first detection signal and the second detection signal;
comparing the detection movement path with the historical movement paths, to select a best matching historical movement path that best matches the detection movement path from the historical movement paths; and
transmitting a driving signal to the actuator located in the third detection range to drive the actuator when the target is predicted to move to a third detection range according to the best matching historical movement path.

2. The detection system according to claim 1, further comprising:
a third detector, connected to the processing device, and configured to generate a third detection signal when the target is detected in the third detection range.

3. The detection system according to claim 2, wherein when the target is in the third detection range, the processing device updates the detection movement path according to the third detection signal.

4. The detection system according to claim 2, the third detection range is adjacent to the second detection range.

5. The detection system according to claim 2, further comprising:
a fourth detector, connected to the processing device, and configured to generate a fourth detection signal when the target is detected in a fourth detection range, wherein when the target is not located in the third detection range for detection, but is located in the fourth detection range for detection, the processing device updates the detection movement path according to the received fourth detection signal.

6. The detection system according to claim 5, wherein the processing device stores the updated detection movement path to the storage unit as a historical movement path.

7. The detection system according to claim 1, wherein the first detector or the second detector is configured to determine whether the target is located in the first detection range or in the second detection range according to the strength of a wireless signal, to generate the corresponding first detection signal or the second detection signal.

8. The detection system according to claim 1, wherein the actuator comprises a monitoring device, the monitoring device is configured to capture an image data or an audio data.

9. A detection method, applied to a processing device, comprising:
receiving a first detection signal generated when a target is detected in a first detection range;
receiving a second detection signal generated when the target is detected in a second detection range;
establishing a detection movement path according to the first detection signal and the second detection signal;
comparing the detection movement path with a plurality of historical movement paths, to select a best matching historical movement path from the historical movement paths that matches the detection movement path the best;

transmitting a driving signal to the actuator in a third detection to drive the actuator when the target is predicted to move to a third detection range according to the best matching historical movement path.

10. The detection method according to claim 9, wherein the third detection range is adjacent to the second detection range.

11. The detection method according to claim 9, wherein after the step of predicting that the target moves to the third detection range, the detection method further comprises:

receiving a third detection signal generated when the target is detected in the third detection range; and updating the detection movement path according to the third detection signal.

12. The detection method according to claim 9, wherein, after the step of predicting that the target moves to the third detection range, the detection method further comprises:

receiving a fourth detection signal generated when the target is detected in a fourth detection range when the target is not in the third detection range, but is located in the fourth detection range; and updating the detection movement path according to the fourth detection signal.

13. The detection method according to claim 12, wherein after the step of updating the detection movement path according to the fourth detection signal, the detection method further comprises:

setting the updated detection movement path to a historical movement path.

* * * * *